United States Patent [19]

Baumann

[11] 4,356,843
[45] Nov. 2, 1982

[54] LAMELLATE FLUID RESISTANCE DEVICE

[76] Inventor: Hans D. Baumann, 32 Pine St., Rye, N.H. 03870

[21] Appl. No.: 338,911

[22] Filed: Jan. 12, 1982

[51] Int. Cl.³ .............................................. F16K 47/08
[52] U.S. Cl. ...................................... 138/43; 138/42; 137/625.3; 137/625.37; 251/127; 181/233; 428/65; 428/137
[58] Field of Search ............................ 138/42, 43, 46; 251/127; 181/233; 428/64–66, 137, 37, 36, 35; 137/625.3, 625.37

[56] References Cited

U.S. PATENT DOCUMENTS 3,802,537  4/1974  White ............................... 138/42 X
4,047,540  9/1977  Orme et al. ................... 137/625.3 X
4,127,146  11/1978  Self ................................... 138/42 X Primary Examiner—George F. Lesmes
Assistant Examiner—A. Thomas

[57] ABSTRACT

A lamellate type low noise fluid resistance device comprising a stack of identical segmented ring-shaped plates having alternate sectional openings which, when circularly displaced with one another, form narrow horizontal fluid passages between the inner and outer diameters of said plates; said stack being bolted together with upper means to close the interior stack passage and lower flange means having a central opening and extending radially outward from the stack outer diameter.

5 Claims, 2 Drawing Figures

LAMELLATE FLUID RESISTANCE DEVICE

BACKGROUND OF THE INVENTION

This invention relates to throttling devices or fluid resistance devices as part of fluid systems where dissipation of moderate pressure differentials is desired. Such dissipation of energy should take place with a minimum of generated noise level.

Acoustical energy, i.e., Soundpower, increases roughly as the 18th power of the flow area of a valve orifice but only to the 10th power of increase in mass flow. It is therefore easy to see that important noise savings can be made simply by keeping the orifice diameter constant and by accommodating the increase in mass flow through increase in the number of parallel orifices. For example, about 14 dB can be saved with a 64-fold increase in mass flow when, instead of employing a single orifice 8 times enlarged in diameter, 64 individual orifices of the same original diameter are used.

While the concept of multiple orifice resistance trim is not new, the production of conventional state of the art devices is rather costly as it involves mechanically drilling a multitude of small holes into heavy sections of stainless plates (see U.S. Pat. No. 3,665,965).

My invention overcomes these difficulties by employing a stack of identical stampings which, when arranged in a certain circularly off-set pattern, automatically create an intricate network of individual small horizontal throttling passages from which fluid is allowed to expand into the downstream pipe cavity.

After suitable arrangement of the plates against each other, the stack is either mechanically fastened or simply brazed together and against a solid flange being part of a piping system.

Any solid or fluid medium vibrating in response to noise energy waves will convert a portion of the energy it receives to heat. With fluids it is the fluid viscosity which occasions the conversion, or damping. A similar noise energy damping reaction occurs as well in solids.

Further, the amount of energy passed on through such media varies with the negative power of the distance that the energy travels within the medium. And in solids like the metals found in pipes, the attenuation in the medium increases with the frequency of the noise energy.

It is thus an object of the present invention to provide apparatus for pressure reduction or throttling of fluid flow with a low acoustical efficiency.

It is a further object of the invention to provide an acoustical filter for absorbing downstream the noise of conventional valves and thereby preventing the radiation of that noise through the fluid conduit walls to its external surroundings.

It is a further object of the invention to provide a device for throttling fluid flow with greatly reduced noise generation by minimum fluid velocity constricting jet means.

It is a further object of the present invention to provide a fluid pressure throttling device which generates noise at a frequency which provides for greater attenuation of the noise energy by the fluid conduit.

A further object of my invention is to provide a pressure reducing device having means to adjustably select the number of flow passages exposed to fluid flow to suit a particular set of fluid system conditions.

These and other objects, features, and advantages of the present invention will be understood from the following detailed description.

DESCRIPTION OF THE PREFERRED EMBODIMENT

Figure 1:
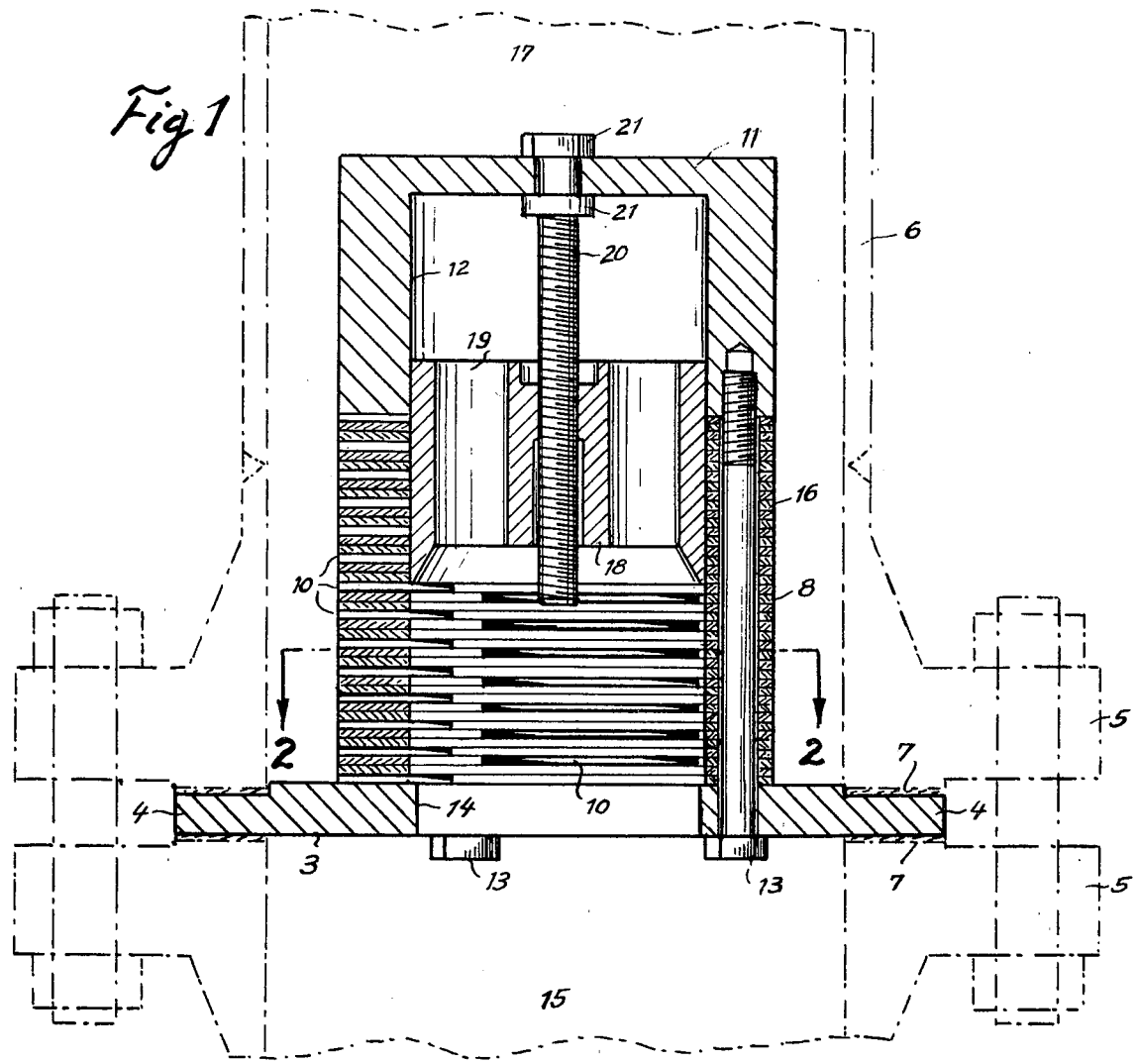
FIG. 1 is a vertical section of a preferred embodiment of my invention.
Figure 2:
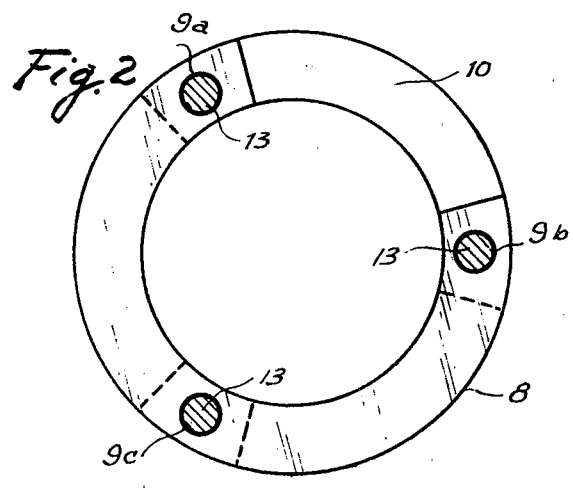
FIG. 2 is a plane view of a single plate, when viewed along lines 2—2, forming part of the embodiment illustrated in FIG. 1.

A typical embodiment of my invented lamellate fluid resistance device is shown in FIG. 1 being part of a piped fluid system (not part of my invention). The device consists of a flanged member 3 whose outer periphery 4 is clamped between a pair of pipe flanges 5 being part of a fluid handling pipe system 6. Suitable gasket means 7 prevent fluid pressure from escaping to the outside. A number of ring-shaped plates 8, shown here subdivided into three segments, each of which has a circular hole 9 punched through it. A portion of one of the segments is removed, thereby leaving a wedge-shaped opening 10. A substantial quantity of these plates are now stacked on top of each other in such a manner that each successive plate is rotatively displaced to the adjacent one by 120°; that is to say, when referring to FIG. 2, perforation 9a will overlap hole 9b of the plate below it and will overlap with hole 9c of the plate above it and so on. The result is a stack of plates 16 wherein each third layer will have a slotted opening with a height equivalent to one plate thickness and a width equal to wedged portion 10 in each third circumferential segment. The uppermost part of the stack of plates is closed off by a closure member 11 shown here cup-shaped and having a central recessed opening 12 whose diameter is identical to the inside diameter of the stack of plates 16.

Once arranged in the proper sequence, flanged plate 3, stack of plates 8, and closure member 11 are joined into a solid assembly by a number of bolts 13 passing through openings 9a, 9b, and 9c. Flanged member 3 possesses a central bore 14 whose diameter is equal to or slightly smaller than the inside diameter of plates 8, allowing fluid from pipe cavity 15 to enter the inside of stack 16, pass slotted openings 10, and exit into pipe cavity 17. This is a preferred flow direction for compressible fluids due to the fact that throttling type pressure reduction enlarges the downstream volume. Opening 14 is smaller than pipe cavity 17 and the circumferential inside diameter width of wedged opening 10 is smaller than the circumferential width of the same opening at the exterior diameter, thereby accommodating the expanding gas volume.

When throttling liquid fluids, no volume expansion takes place and the preferred flow direction is from pipe cavity 17 through slotted opening 10 into pipe cavity 15 while passing opening 14. In this manner the fluid velocity is lower at the point of entry into wedge-shaped opening 10 due to the greater circumferential width. Analogically, the highest velocity will occur at the inside circumferential portion of passage 10 (having the smallest cross-sectional area). This is of great significance and advantage when handling liquids that tend to cavitate. Cavitation causes high implosive pressure waves that are very destructive. Placing the point of vapor formation, which occurs at the point of highest jet velocity, inside each plate and away from metal contact will avoid this highly destructive erosion.

As mentioned previously, the most effective mechanism for noise reduction is the provision of a multitude of small orifices. However, each separate jet loses its identity and starts to mingle with the adjacent jet if the distance between them is small or, conversely, if the pressure ratio is very high. It has been established, for example, that the limit of noise reduction is reached where the pressure ratio across the device exceeds a number obtained by dividing the distance between the passages by 15% of the passage size. In the preferred embodiment shown in FIG. 1, the distance of solid metal between each passage is equivalent to two slot openings (plate thicknesses), the effective orifice size being equivalent to one plate thickness. It is therefore possible to accommodate pressure ratios as high as 13 to 1 without losing the beneficial noise reduction.

Obtaining the correct pressure ratio desired is, of course, a function of the mass flow, the density, and the total exposed flow area. Quite often, the first two variables are not exactly known at time of construction of the equipment and it is therefore necessary to provide means to adjust the exposed flow area to accommodate the ultimate realities in fluid conditions.

Such provision for adjustment of flow area is provided in my invention by the use of a piston 18 which slidingly engages the inside diameter of stack 16 and recess 12. Piston 18, furthermore, has communicating ports 19 allowing fluid pressure to be balanced on either side. A threaded spindle 20 whose upper portion 21 is rotatively secured within member 11 threadingly engages piston 18. A certain degree of rotation of spindle 20 will force piston 18 to slide up or down within stack 16 and thereby cover or uncover the number of desired flow passages 10.

My invention has been described in a preferred embodiment. However, nothing herein should be construed as a limitation on my subsequent claims. For example, instead of three segmental positions of plate 8, there can be two, four, or any other multiple choice. Furthermore, it is an obvious variation to use two or more plates in the exact segmental position thereby increasing the height of each flow passage to a multiple of one plate thickness. Additionally, flanged support member 3 could be an integral part of pipe flange 5 or any other device being part of a fluid system.

Having thus described my invention, I claim the following:

1. Lamellate fluid resistance device comprising:
   a. a stack of flat ring-shaped plates, having inner and outer diameters, each plate being subdivided into a number of even segments, each segment containing at least one perforation, extending along a circle located approximately midway between each plate's inner and outer diameter, one of said segments having a wedge-shaped opening of a width several times the plate thickness and extending radially between the plates' inner and outer diameters, all stack plates being angularly displaced with respect to each other by an angular distance of at least one of said segments so that the wedge-shaped opening of one plate can overlap the closed segment of the next plate, defining thereby a fluid passage between the inner and outer diameter of said stack of plates;
   b. means to support said stack of plates having a central opening in close proximity to the inside diameter of said plates, and having an external diameter extending beyond the outside diameter of said stack of plates;
   c. means to close off the upper terminating plate of said stack;
   d. a number of fastening devices interconnecting the means to support the stack of plates, each individual plate by means of said perforations, and said means to close off the upper terminating part.

2. Lamellate fluid resistance device as described in claim 1 containing additional sliding means engaged within the inside diameter of said stack of plates to selectively block one or more of said fluid passages within said stack of plates.

3. Lamellate fluid resistance device as described in claim 2, wherein adjusting means are provided between the means to close off the upper terminating plates of said stack and said sliding means inside the stack of plates.

4. Lamellate fluid resistance device as described in claim 1, wherein the means to support said stack of plates extends substantially in a radial direction beyond the outside diameter of said stack of plates and capable of being retained between a pair of pipe line flanges to effectively block the flow of fluid through any such pipe line system except for the central opening communicating with the inside diameter of said stack of plates.

5. Lamellate fluid resistance device as described in claim 1, wherein each plate is subdivided into three segments, each 120° apart, and containing within a circular perforation accepting said fastening means and wherein one of the segments contains a wedge-shaped opening extending circumferentially approximately one-quarter of the circumference, each of these plates being circumferentially displaced by a distance equal to ⅓ of the circumference in respect to each other, thereby providing a succession of slotted flow passages, each being separated from the next flow passage by a layer of two solid plate segments, and each being separated circumferentially by 1/12 of the plate circumference.

* * * * *